United States Patent [19]

Dewar et al.

[11] Patent Number: 4,841,460

[45] Date of Patent: Jun. 20, 1989

[54] METHOD AND APPARATUS FOR CALIBRATING A NON-CONTACT GAUGING SENSOR WITH RESPECT TO AN EXTERNAL COORDINATE SYSTEM

[75] Inventors: Robert Dewar, Troy; Dale R. Greer, Novi, both of Mich.

[73] Assignee: Perceptron, Inc., Farmington Hills, Mich.

[21] Appl. No.: 94,329

[22] Filed: Sep. 8, 1987

[51] Int. Cl.⁴ .................. G06G 7/48; H04N 7/18
[52] U.S. Cl. ................. 364/571.02; 364/559; 364/167.01; 356/375
[58] Field of Search .......... 364/167, 571, 559, 516, 364/513, 558, 525; 356/3, 375, 376; 901/9, 47

[56] References Cited

U.S. PATENT DOCUMENTS

| | | | |
|---|---|---|---|
| 3,986,007 | 10/1976 | Ruoff, Jr. .......................... 235/151 |
| 4,396,945 | 8/1983 | Dimatteo et al. ..................... 901/9 |
| 4,639,878 | 1/1987 | Day et al. ............................. 901/9 |
| 4,645,348 | 2/1987 | Dewar et al. ........................ 356/376 |
| 4,649,504 | 3/1987 | Krouglicof et al. ................. 364/559 |
| 4,651,283 | 3/1987 | Sciaky et al. ....................... 364/167 |
| 4,669,052 | 5/1987 | Bianco ................................. 364/571 |
| 4,672,564 | 6/1987 | Egli et al. ............................ 364/513 |
| 4,754,415 | 6/1988 | George et al. ....................... 364/571 |

OTHER PUBLICATIONS

"The Portable C.A.T. 2000 Coordinate Measurement System," published by Wild Heerbrugg Instruments, Inc., undated.

Primary Examiner—Jerry Smith
Assistant Examiner—Paul Gordon
Attorney, Agent, or Firm—Harness, Dickey & Pierce

[57] ABSTRACT

One or more non-contacting gauging sensors are calibrated to a common external coordinate system by providing each sensor to be calibrated with a target which can be simultaneously viewed by the sensor and an external measuring system for determining coordinates of the target in terms of the external coordinate system and in terms of the sensor coordinate system. With the resulting spatial coordinates of the target expressed in both frames of reference, transform matrix coefficients can be calculated, for example with a programmable computer, to calibrate each sensor to the preselected common external coordinate system.

38 Claims, 5 Drawing Sheets

METHOD AND APPARATUS FOR CALIBRATING A NON-CONTACT GAUGING SENSOR WITH RESPECT TO AN EXTERNAL COORDINATE SYSTEM

BACKGROUND OF THE INVENTION

The invention relates generally to non-contact gauging systems employing a plurality of gauging sensors directed at predetermined points on a workpiece to be gauged. More specifically, the invention concerns calibration of one or more non-contact sensors with respect to an external coordinate frame of reference.

In the manufacture of parts and assemblies by processes such as stamping, extrusion, drawing and casting from materials such as sheet or bulk metal, plastic, film, rubber and the like, it is often required that accurate dimensional measurements be performed either on-line as the manufacturing process operates upon the part or assembly or off-line upon samples of gauged workpieces temporarily removed from the manufacturing production line. In order to obtain economies of manufacturing and produce high quality parts, it is necessary that measurements be made to ensure that dimensional tolerances are maintained. Such measurements must be made rapidly at many points on each produced part or assembly and in such a manner that the part or assembly itself is not touched or otherwise affected substantially by the measuring process itself. Measurements are often required to be performed which determine the position in three dimensional space of certain identified points or features which exist on the manufactured part or assembly being gauged. Such points or features typically include edges, corners, holes, designated portions of a surface, studs and intersections of surfaces. Special and general purpose computers exist which are capable of determining such measurements from image data produced by sufficiently intelligent sensor-illuminator systems.

One such sensor-illuminator system which operates on the triangulation principle to generate image data usable by a machine vision computer is disclosed in U.S. Pat. No. 4,645,348—Dewar, et al., assigned to the same assignee as the instant invention. As disclosed in the U.S. Pat. No. 4,645,348—Dewar, et al. the gauging sensor is internally calibrated with respect to the sensor's own coordinate system by use of so-called "rectification" tables. The contents of the rectification table give the coordinates in space relative to the coordinate system of the sensor of each point which reflects light of predetermined quality back to each corresponding picture element of "pixel" of the gauging sensor's light receptive sensing system.

The next step in calibrating a sensor such as that disclosed in the Dewar, et al. patent is to establish a point of reference external to the sensor for the measurements effected through use of the rectification table. In known measuring systems, such sensors are calibrated to some type of master or "golden" part. However, such calibration to a master part results in less than optimum measurement system calibration in the case of large work pieces, such as large portions of automotive vehicles. Where the part is very large, the corresponding master part is likewise large and prone to distortion when moved from one location to the next. Therefore, when moving a large master part to a gauging fixture, the part distorts and the calibration error will exceed acceptable levels.

An additional problem with prior calibration approaches is the necessity for very accurately determining the precise location in the external reference coordinate system of each sensor to be calibrated. Only in this way in the prior art could the sensor data be accurately related to the external point of reference. Such precise alignment of a plurality of sensors in a relatively large gauging station area has proven very difficult, if not infeasible.

Additionally, the user of the non-contact gauging system may desire to measure the same parts with a coordinate measuring machine which requires moving the part and mounting it in a different fixture. Because the part may be mounted differently in each fixture, the measurements will not be consistent.

Manufacturing operations are quickly moving into the era of using a common reference coordinate system from the design of the workpiece in a CAD/CAM environment and performing all measurements and manufacturing operations at each manufacturing station relative to a common coordinate system.

Therefore, there is seen to be a need for the capability of calibrating each sensor of a multi-sensor gauging array to a common external coordinate system rather than to the internal coordinate system of each individual sensor.

SUMMARY OF THE INVENTION

It is an object of the invention to provide a method and apparatus for the calibration of one or more measurement sensors such that the spatial position coordinates expressed relative to each sensor's local coordinate system can be transformed into coordinates relative to a physical target or targets defining an external spatial coordinate system.

It is a further object of the invention to eliminate the need for the use of a master part in calibrating the measurement of gauging sensors of a non-contact gauging system.

Accordingly, an arbitrarily oriented non-contact gauging sensor is calibrated with respect to an external coordinate system by providing a target which lies simultaneously within the measuring zone of the sensor and the measuring zone of measuring means external to the sensor. The sensor determines a set of first spatial coordinates of the target expressed in terms of the local sensor coordinate system. The external measuring means is likewise used to determine a set of second spatial coordinates of the target expressed in terms of the external coordinate system. Then with the resulting spatial coordinates expressed in both frames of reference for each target point, transform matrix coefficients can be calculated to calibrate each sensor to the desired coordinate system.

It is a feature of the invention that calibration is accomplished by direct measurements of the same target expressed simultaneously in multiple coordinate systems of interest.

It is a further feature of this invention that the calibration approach avoids the error stack-ups and uncertainties which arise using other methods dependant upon indirect reference points or targets defining the origin or orientation of sensor space.

It is still a further feature of the invention that it avoids the problems of accuracy evaluation based upon correlation with other measurement methods.

It is yet a further feature of this invention that it permits the sensors to be calibrated to an external coordinate system without the need for high levels of accuracy in the fabrication or positioning of the targets used in the calibration apparatus and method.

It is still a further feature of the invention that the target used in the calibration process is created directly by the sensor's gauging medium, thereby avoiding the necessity for high levels of accuracy in the fabrication or positioning of reference surfaces or targets on the exterior of the sensor.

BRIEF DESCRIPTION OF THE DRAWING

These and other objects and features of the invention will become apparent from a reading a detailed description taken in conjunction with the drawing, in which.

DETAILED DESCRIPTION

Figure 1:
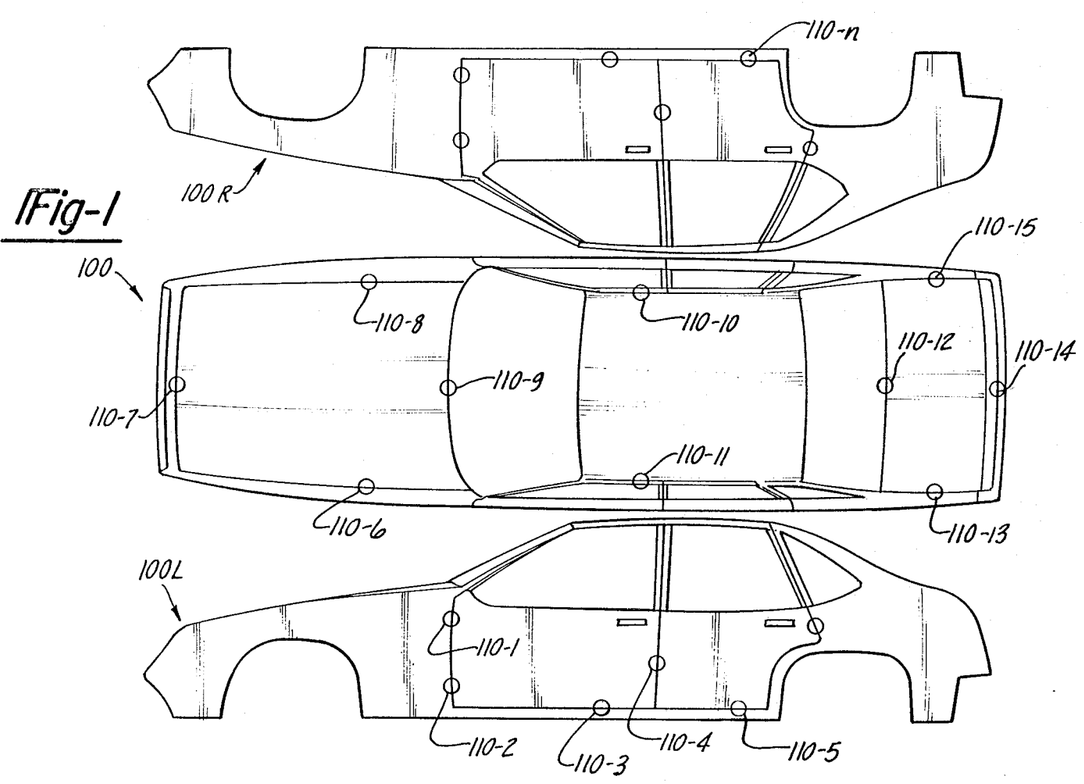
FIG. 1 is a simultaneous top and side view of a portion of an automotive vehicle body showing typical points of interest which would be placed in the field of view of a plurality of non-contact sensors at a gauging station.

With reference to FIG. 1, there is shown a typical automotive vehicle body portion which prior to its assembly with other of the vehicle components would require gauging of certain key points. Such miscellaneous points of interest on workpiece 100 of FIG. 1 are shown as points 110-1 through 110-n. The left side 100L of the vehicle body and the right side 100R of the vehicle body are shown in an "unfolded" view for convenience in FIG. 1. Typical usages of the points or the manner in which they are selected would be dictated, for example, by the ensuing assembly process to take place with respect to the workpiece 100. For example, assume that the hood has not yet been assembled over the hood cavity at the front of the vehicle. Then measurements about the periphery of the hood cavity such as at points 110-6, 110-7, 110-8 and 110-9 could be made to determine whether the ensuing assembly of the hood lid to the vehicle body can be performed with an acceptable fit between the parts to be assembled.

While there are many sensor arrangements known, including the optical arrangement disclosed in the above-cited patent to Dewar, et al., it has been extremely difficult to calibrate the sensor readings at all the desired points of interest about a large workpiece with respect to any desired external reference system.

Figure 2:
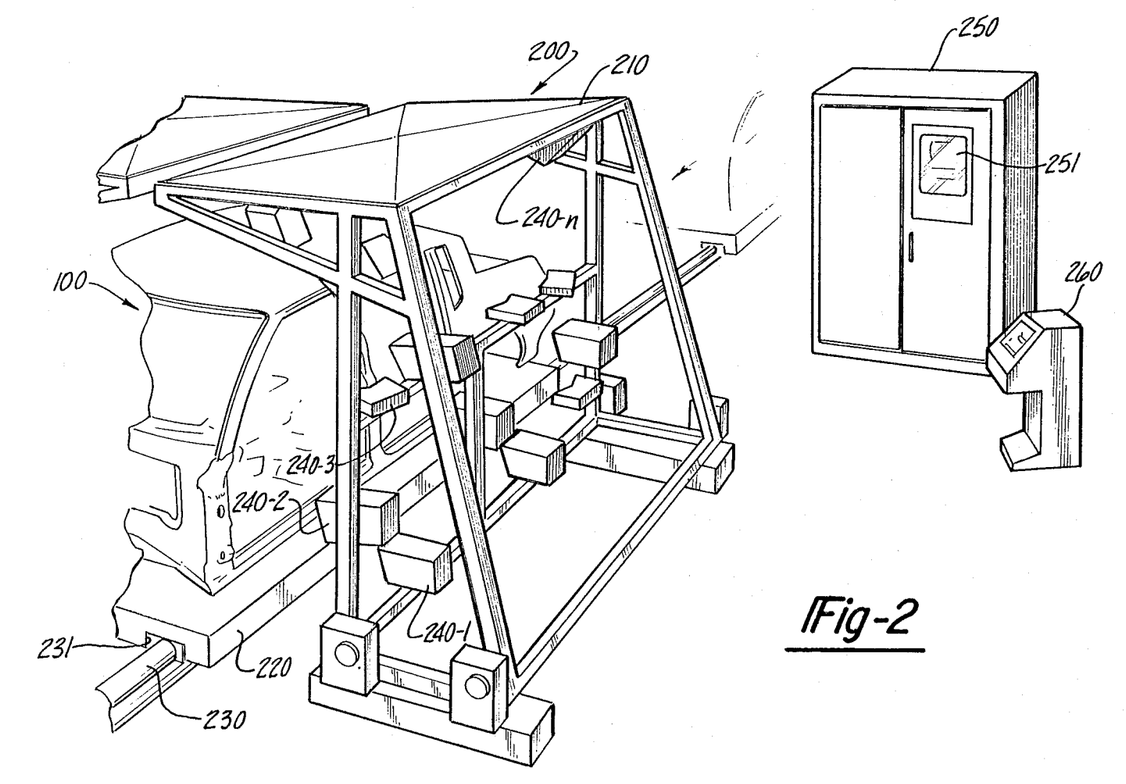
FIG. 2 is a perspective view of a typical gauging station on an automotive assembly line including a plurality of non-contact sensors to be calibrated in accordance with the principles of the invention.

A typical gauging station for an automotive vehicle part as shown in FIG. 1 could take the form set forth in FIG. 2. Workpieces to be gauged at gauging station 200 rest on transporting pallets 220 which are moved along an assembly line via pallet guides 230 which pass through guide channels 231 in the pallet. At the gauging station 200, a sensor mounting frame 210 (only one-half of which is shown in perspective in FIG. 2) surrounds the workpiece 100 to be gauged and provides a plurality of mounting positions for a series of optical gauging sensors 240-1 through 240-n each designed in accordance with the disclosure of U.S. Pat. No. 4,645,348—Dewar, et al. Communication cables, which are not specifically shown in FIG. 2 for clarity, couple the sensors 240 to a machine vision computer 250 which includes a CRT or cathode ray tube display 251. Optionally provided with a typical machine vision computer is a printer 260. It is to the typical gauging station as set forth in FIG. 2 that the apparatus and method of this invention is to be applied for effecting calibration of each of the sensors 240 with a predetermined external coordinate system associated, for example, with the workpiece 100 to be measured.

Apparatus and a method for calibrating each of the sensors 240 of FIG. 2 is best described with reference to FIGS. 3, 4 and 5. The gauging sensor 240 to be calibrated is rigidly but releasably coupled to a target 340 which is located simultaneously in the field of view of the gauging sensor 240 and in the field of view of an external measuring system comprised, for example, of a pair of theodolites 301-1 and 301-2.

The theodolite is a commercially available survey instrument for measuring horizontal and vertical angles, similar in principle to the transit. A pair of typical theodolites 301-1 and 301-2 shown in FIG. 5 are respectively coupled to a computer and display 500 by signaling bus 520 and signaling bus 510. The fundamental mathematical principle of operation of the theodolites is, as with the case of the typical gauging sensor 240, based on triangulation. The theodolites 301-1 and 301-2 measure both horizontal and vertical angles to a selected target and enter the digitized angular data into the computer 500 for conversion to conventional coordinates of three dimensions such as the familiar x, y and z cartesian coordinate system. Initially, the theodolites 301-1 and 301-2 are set up and sighted at each other along a so-called collimation line 310 (FIG. 3) to establish a base line from which to perform triangulation and are then each sighted at both ends of a precisely machined reference bar made, for example, of INVAR such as shown at 320 in FIG. 3. The reference bar 320 is of a known precise length between its first end 321 and its second end 322. Hence, after the readings on the reference bar, the theodolites will have determined their distance from each other.

Theodolite 301-1, shown in phantom at 301-1P, is therefore pivoted to take readings along line 331 to the second end 322 of bar 320 and along line 332 to the first end 321 of the bar 320. In a similar fashion theodolite 301-2, shown in phantom at 301-2P, is pivoted to take readings along lines 331 and 334 with respect to bar 320. These measurements enable the computer 500 coupled to the two theodolites (see FIG. 5) to calculate the positional relationship of the theodolites with respect to each other.

Next, to enable the theodolite external measuring system to generate measured data in terms of a selected external coordinate system, known programs are used by computer 500 to operate on theodolite measurement data taken from predetermined known points in the external coordinate space. Using two theodolites, as shown in the arrangement of FIG. 3, at least three reference points must be observed by each theodolite in order for the computerized initialization to be effected. Other known initialization techniques utilize three theodolites, and these alternative approaches are discussed in a later section of this description with reference to FIGS. 6A–D. One commercially available theodolite measuring system capable of performing the required initialization to an external coordinate system for use with this invention is the C.A.T. 2000 System of Wild Heerbrugg Instruments, Inc.

Figures 3, 4:
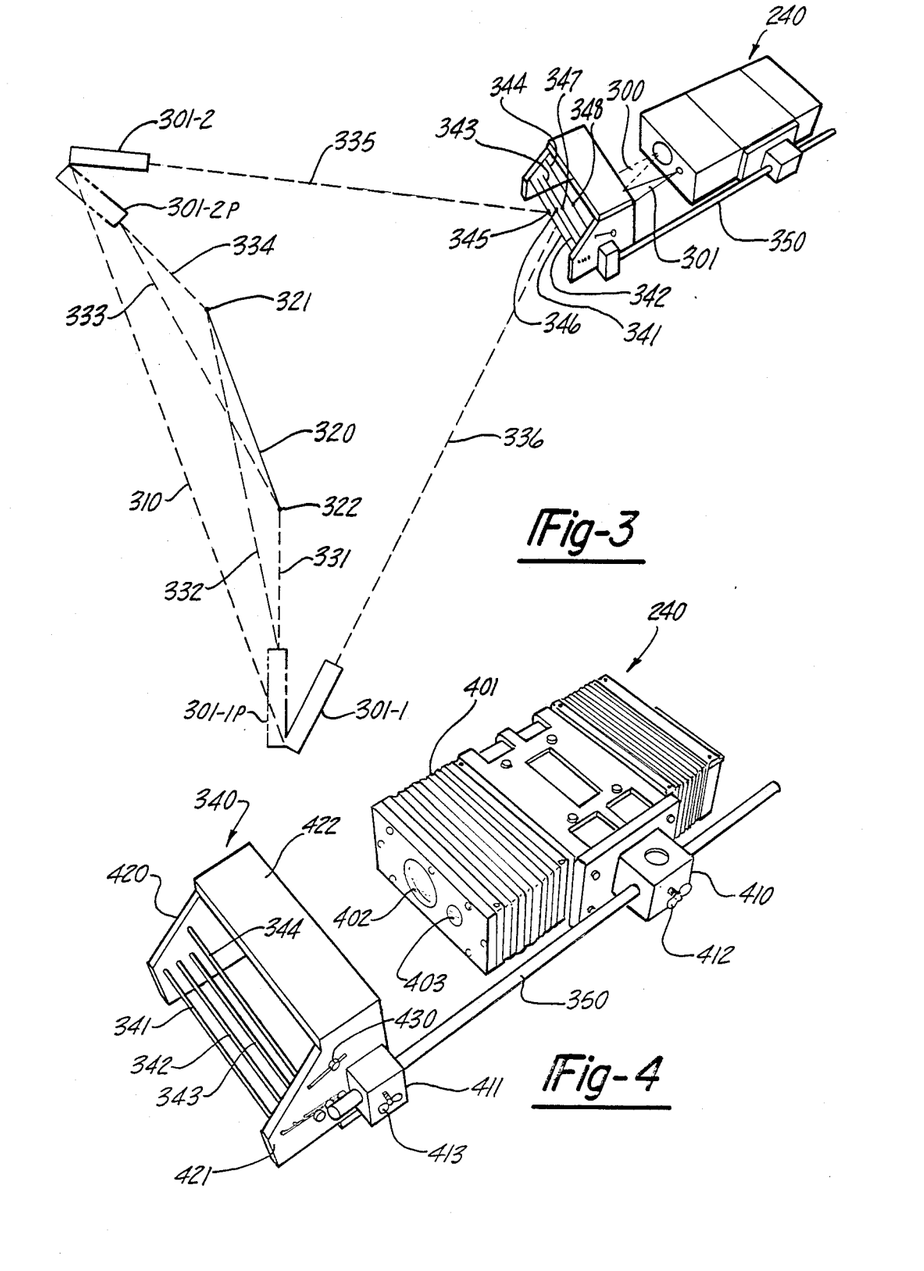
FIG. 3 is a functional diagram showing a typical sensor to be calibrated, its target, and an external measuring system such as a pair of theodolites.
FIG. 4 is a perspective view of a sensor and its associated target shown in more detail.

With continued reference to FIGS. 3 and 4, the target 340 includes a transverse wall 422 connecting first and second side walls 420 and 421, respectively. Side walls 420 and 421 are for retention of first and second ends of a set of four elongate asymetrically arranged members or fiber-like strands 341, 342, 343 and 344. Preferably fibers 341–344 are fashioned from substantially white, translucent material. Each end of the fiber is coupled or tied down at a respective side wall of the target body by a coupling plus 430. The axes of the fibers 341–344 extend generally transversely to a sensor generated light plane 300. Preferably the orientation of the fibers 341 through 344 is substantially perpendicular to the plane 300.

The target 340 is rigidly yet releasably and adjustably coupled to the gauging sensor 240 via a target coupler member 350 which comprises a substantially cylindrical rod which is slidingly received in mating bores of mounting block 410 coupled to gauging sensor housing 401 and mounting block 411 which is coupled to, or alternatively an integral part of, target 340. The precise longitudinal position of the target with respect to the end face of the gauging sensor 240 which does the actual illumination of the target is adjustable by means of wing-tipped set screws 412 and 413 engaging mating threaded bores respectively in mounting blocks 410 and 411, the threaded bores intersecting the mating bore which receives the target coupler member 350. Hence, both the target 340 and the sensor housing 401 which are respectively coupled to mounting blocks 411 and 410 may be slid along rod 350 to a preselected relative position and then the screws 412 and 413 may be tightened to maintain the desired orientation during the ensuing calibration of the sensor with respect to an external coordinate system.

While target 340, as shown in FIG. 4, may have solid housing or fiber-mounting walls, such as 420, 421 and 422, it may be preferable for many applications for the fiber-carrying frame to take the form of a wire-like or cage structure with substantially open walls. Such a cage-like arrangement is to exhibit minimum obstruction to line-of-sight access to the target fibers by the theodolites. Hence, with the wire frame or cage type body instruction, the same target design could be used with a wide variety of sensor mounting arrangements while ensuring line-of-sight access to the target points by the theodolites.

Hence the target 340 is placed with respect to the sensor at a position approximately the same as that of the points of interest to be gauged when an actual part is present. Then the sensor is activated to project a measuring plane of light 300 in the direction of the target such that the intersection of the light plane 300 with each of the asymmetrically arranged fibers 341 through 344 will, at each fiber, result in an illuminated target point 345, 346, 347 and 348. It will be seen, therefore, that the target points 345 through 348 have been generated without the necessity for precise positioning or aiming of sensor 240 measuring light plane 300. Light plane 300 emanates from light plane output aperture 402 in housing 401 of sensor 240.

Figure 5:
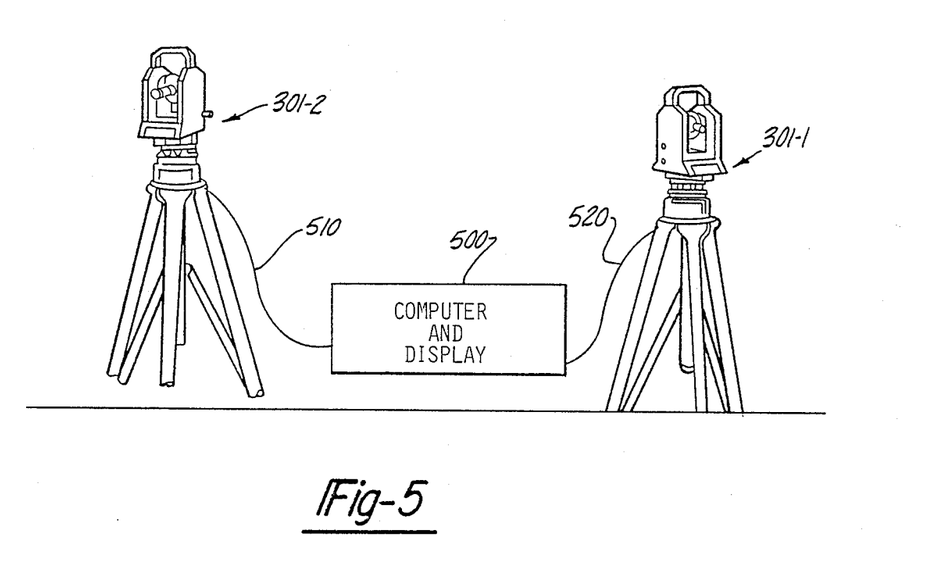
FIG. 5 is a diagram setting forth two typical theodolites and their associated computer and display apparatus.

At this point, the target points 345 through 347 will be in the field of view of both the gauging sensor 240 and the external measuring apparatus comprised of the theodolite pair 301-1 and 301-2 and associated computer 500 (FIG. 5). The coordinates of the target points 345 through 348 as expressed in terms of the sensor's coordinate system are determined by the reflection of the illuminated target points back through light receiving aperture 403 of gauging sensor 240 to an array of pixel elements such as photo diodes. The coordinates are determined by an associated machine vision computer using rectification table contents transmitted to the computer by the sensor as described in the above cited U.S. Pat. No. 4,645,348 to Dewar, et al. In other words, the gauging sensor 240 is intrinsically pre-calibrated by virtue of the rectification table, and the measurements made by the sensor are therefore, by virtue of this pre-calibration, reported in standard units of measure relative to this internal sensor coordinate system.

At substantially the same time, theodolites 301-1 and 301-2 via sighting paths 336 and 335, respectively, likewise take non-contact measurements of the generated target points 345 through 348. The angular measurement data from the theodolites are passed to computer 500 for transformation into coordinate information for each of the target points as expressed in terms of the preselected external reference coordinate system. Hence, at this point, the calibration approach contemplated now has each target point expressed in terms of the two coordinate systems to be interrelated in the calibration process.

The measurement data in both sets of coordinates are passed to an appropriate transforming mechanism such as a programmable computer. The particular computer storing the transform program could, for example, be computer 500 of FIG. 5 associated with the theodolite external measuring system. Alternatively, the transform program could reside in the machine vision computer normally associated with the sensor 240. Yet another alternative would be to transmit the sensor and theodolite data to a computer or other calculating instrument not directly associated with either measuring system.

The transform computer performs the following basic functions to obtain the desired transformation parameters. First, sensor vectors are created by expressing the location of each target point with reference to a mean of all sensor-measured coordinates. The sensor vectors are specifically created by subtracting the mean of all sensor coordinate component values from the individual sensor coordinate values.

For example, assume three target points 1, 2, 3, having sensor coordinates as follows:
target point $1 = X_s = 1$, $Y_s = 5$, $Z_s = 2$
target point $2 = X_s = 0$, $Y_s = 9$, $Z_s = 4$
target point $3 = X_s = 8$, $Y_s = 0$, $Z_x = 1$.
Then the means coordinate points would be
$X_s = (1+0+8)/3 = 3$
$Y_s = (5+9+0)/3 = 4.67$
$Z_s = (2+4+1)/3 = 2.33$
Hence, sensor vectors for each target point may be created, with each vector beginning at point $(\overline{X}_s, \overline{Y}_s, \overline{Z}_s)$ and terminating at the measured coordinates of the target point. For this example, the sensor vector for target point 1 would have respective X, Y and Z components of $1-3 = -2$; $5 - 4.67 = 1.67$; and $2 - 2.33 = -.33$.

Next external coordinate system vectors or external vectors are created in a similar manner by subtracting the mean of all the external coordinate values from each specific external coordinate measured. These steps of creating sensor and external vectors establishes an origin for use in mathematically manipulating the vectors to obtain the most accurate transformation.

To effect the transformation, a minimum of three target points is required. However, adding the preferred fourth point provides for better verification of how well or accurately the system is measuring the points. Use of the fourth point also provides more data to give a better fit between the external and sensor coordinate systems via the mathematical curve fitting or approximation approach chosen.

It is known from mathematical theories of coordinate transformations that for a homogeneous transformation from one coordinate system to another, each coordinate of the new system is given as a function of all three coordinates of the system to be transformed. Hence, to derive a transformation from the sensor coordinate system to the external coordinate system, the problem is to determine the coefficients in the following set of transformation equations:

$$X_{ext} = A_{11}X_s + A_{12}Y_s + A_{13}Z_s + \Delta X$$

$$Y_{ext} = A_{21}X_s + A_{22}Y_s + A_{23}Z_s + \Delta Y$$

$$Z_{ext} = A_{31}X_s + A_{32}Y_s + A_{33}Z_s + \Delta Z$$

The matrix of coefficients $A_{11} \ldots A_{33}$ comprises a rotational transform, while the while the set of parameters $\Delta X$, $\Delta Y$, $\Delta Z$ represents components of a translational transform.

As an initial consideration, however, the transform program must determine which coordinate set for a target point, as expressed in sensor coordinates, should map into which coordinate set for a target point expressed in external coordinates. For example, assuming three target points, the transform will have three sets of points (X, Y, Z) transmitted to it by the sensor computer and the theodolite computer. However, at this point, the transform program does not have the benefit of knowing which of these external coordinate sets corresponds to the first, second and third coordinate sets expressed in sensor coordinates. Therefore, all permutations of ordered pairs of coordinate sets from the sensor and external systems must be examined to determine which exhibits the least transformation error.

To determine the best approximation to the set of $A_{ij}$ coefficients for the rotational transformer, an appropriately programmed computer, for example, would take all the permutations of sensor vectors mapping into world vectors, and, for each permutation, the following steps would be performed:

(a) for all of the sensor coordinates, find the pair of sensor vectors whose cross product yields the largest vector;

(b) create the cross product for the corresponding pair of external vectors;

(c) determine the least squares mapping of all sensor vectors and the largest sensor cross product vector to the X axis of the external vectors and the external cross product vector;

(d) repeat step c for the Y and Z axes.

The resulting transformation from the sensor vectors to the external vectors is checked for orthogonality. One approach possible to checking such orthogonality is to treat the coefficients $A_{11}$, $A_{12}$ and $A_{13}$ as vector components and likewise treating the triplets $A_{21}$, $A_{22}$, $A_{23}$ and $A_{31}$, $A_{32}$, $A_{33}$ as components of three dimensional vectors. The orthogonality check is to determine that the magnitude of all three A vectors is very close to unity. This is easily done by computing the square root of the sum of the squares of each vector's three components. This test is merely another way of saying that the unit vector in one coordinate space must map into a vector of unit length in the other coordinate space for perfect orthogonality.

If the orthogonality is acceptable within a predefined target error, then the transformation error terms for each individual permutation are examined to find the smallest error observed. The permutation with the smallest error is then chosen as the proper transformation association between the coordinate points in the two systems.

Now that the best approximation to the values for $A_{11}$ through $A_{33}$ have been determined using a least squares method of conformal mapping, the translation coefficients $\Delta X$, $\Delta Y$ and $\Delta Z$ may be determined by substituting the known measured values of $X_{ext}$, $Y_{ext}$, $Z_{ext}$ and $X_s$, $Y_s$, $Z_s$ into the above three simultaneous equations to solve three equations in three unknowns for $\Delta X$, $\Delta Y$, and $\Delta Z$. Assuming the accuracy with the selected transform is within acceptable levels, then the values of $A_{11}$ through $A_{33}$, $\Delta X$, $\Delta Y$ and $\Delta Z$ are used to transform any measured sensor coordinate into the desired external coordinate system.

It is to be understood, of course, that more than a single plane of light from the gauging sensors could be utilized in conjunction with the target fibers to generate more than four points of interest which would be simultaneously observable by the theodolite system. For example, a cross hair comprised of two intersecting planes of light could be directed to the target resulting in a field of eight target points.

Matrix computations, least squares approximation theory, and vector manipulation are well known in the mathematical arts. Example reference materials pertinent to the mathematical transformations to be effected by, for example, a programmable computer as contemplated by this invention are *Handbook of Mathematics*, I. N. Bronshtein and K. A. Semendyayev; *Matrix Computations*, G. H. Golub and C. F. Van Loan; *The VNR Concise Encyclopedia of Mathematics*, published by Van Nostrand Reinhold Company; and *Numerical Recipes, The Art of Scientific Computing*, W. H. Press, B. P. Flannery, S. A. Teukolosky and W. T. Vetterling.

Figures 6A, 6B, 6C, 6D:
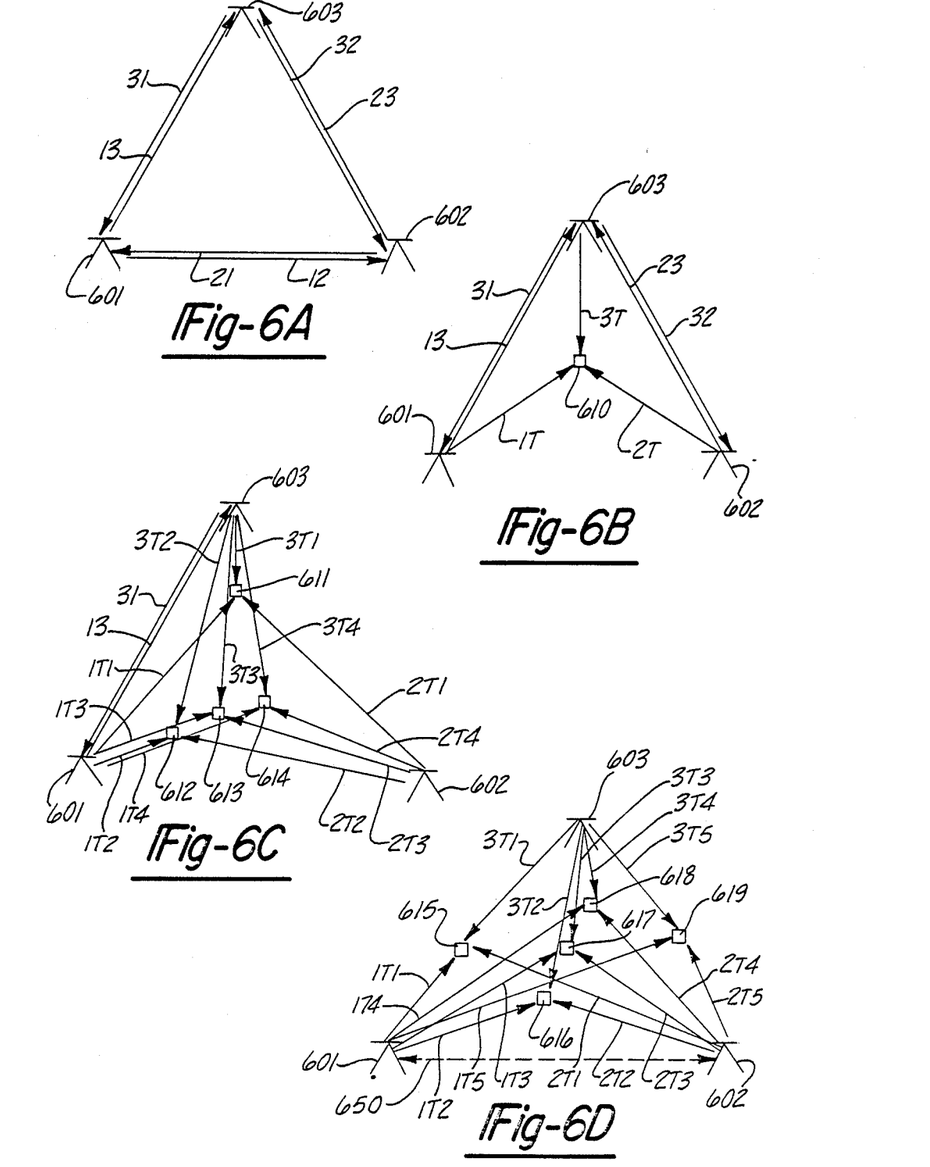
FIGS. 6A–D set forth four alternative approaches to defining the external coordinate system using three theodolites.

FIGS. 6A through 6D set forth four alternative approaches to defining the external coordinate system via the use of three theodolites 601, 602 and 603. In FIG. 6A, the external coordinate system is defined using three theodolites and a computer (not shown) to establish good collimation between each pair of stations. Hence, collimation from station 601 to station 603 via path 13 and from 603 to 601 via path 31 is performed. In a similar manner, paths 12 and 21 are used for collimation establishment between station 601 and 602, while paths 23 and 32 are used for collimation between 602 and 603.

In FIG. 6B, a second alternative for initializing the system to the desired external coordinate system is effected by establishing good collimation between any one thodolite station and the other two stations, for example, between stations 601 and 603 (via lines 13, 31) and between 602 and 603 (via lines 23, 32). Then the theodolites are used to measure a common reference target 610 from each station via measuring vectors 1T, 2T and 3T, respectively.

FIG. 6C sets forth a third alternative to defining the external coordinate system whereunder good collimation is established between any two stations, for example, between stations 601 and 603 and then each station takes measurements with respect to four common reference targets 611, 612, 613 and 614. The measurement vectors are shown using the notation mTn where m is the number of the measuring station and n is the number of the common reference target. For example, station 601 (station 1), which is the first theodolite station, takes a measurement of the second common reference target 612 via vector 1T2.

A fourth alternative is set forth in FIG. 6D and involves an approximation of collimation between any two stations such as between stations 601 and 602, followed by measurements from each of the three stations to five common reference targets 615, 616, 617, 618 and 619. The notation used for the measurement vector from a given station to a given target is the same as used in the conjunction above with FIG. 6C.

Hence, it will be seen that in accordance with the principles of the invention, because the sensor itself creates the target points to be commonly measured with the external measuring system, there is never a need for an accurate knowledge of the precise positioning in the external coordinate space of each individual sensor. Likewise, it will be seen that there is no need for a master part for use by all sensors during the calibration process. The prior art approaches to calibration have attempted (with dubious success) to accurately and repeatably locate the position and orientation of each sensor in six degrees of freedom. Through use of this invention it will be seen that, advantageously, the user of the measuring system designed in accordance with the principles of the invention need only determine the location of the sensor's field of view through use of the target device for generating at least three illuminated target points.

The above described method and apparatus also finds utility in robotics applications wherein the sensor to be calibrated and the target are relatively located with respect to each other by a tactile element, or "hand", of a robot. With the present invention, calibration of a sensor could, for example, be performed either by moving a target into the field of view of a mounted sensor or, alternatively, by moving a portable sensor into appropriate position with respect to a fixed target.

The invention has been described with reference to a detailed description of a preferred embodiment. The details of the description are given for the sake of example only and are not intended as limitations upon the scope and spirit of the appended claims.

What is claimed is:

1. A method for calibrating an arbitrarily oriented non-contact measurement sensor that is pre-calibrated and includes a structural light source and optical sensing means, with respect to an external coordinate system, the method comprising:
   using the structured light from the sensor to create a target lying simultaneously within a measuring zone of the sensor and a measuring zone of measuring means external to the sensor;
   using the sensor to determine first spatial coordinates of the target expressed in terms of the sensor's coordinate system;
   using the external measuring means to determine second spatial coordinates of the target expressed in terms of the external coordinate system; and
   transforming the first spatial coordinates into the coordinates expressed in terms of the external system using the first and second spatial coordinates of the target.

2. The method of claim 1 wherein the sensor is coupled to a tactile element of a robot means for movement relative to the target.

3. The method of claim 1 wherein the target is coupled to a tactile element of a robot means for movement relative to the sensor.

4. The method of claim 1 wherein the structured light source from the non-contact gauging sensor emits at least one plane of light defining the sensor measuring zone.

5. The method of claim 4 wherein the external measuring means comprises at least two theodolites, each coupled to means for generating measurement data expressed in terms of the external coordinate system.

6. The method of claim 5 wherein the target comprises at least three points simultaneously viewable by both the optical sensing means of the sensor and the at least two theodolites.

7. The method of claim 5 wherein the target comprises four non-symetrically positioned points simultaneously viewable by the optical sensing means of the sensor and the at least two theodolites.

8. The method of claim 1 wherein the step of transforming further comprises:
   (a) creating sensor vectors by subtracting the mean of all sensor coordinates from the coordinates of the target as measured by the sensor;
   (b) creating external coordinate vectors by subtracting the mean of all exterior coordinates from the coordinates of the target as measured by the external measuring means;
   (c) ordering pairs of sensor and external coordinates for all possible permutations thereof;
   (d) for each permutation
      (i) determining a pair of sensor vectors yielding the largest cross product vector therebetween;
      (ii) generating a corresponding cross product for a corresponding pair of external coordinate vectors;
      (iii) determining a least squares mapping of all sensor vectors and the largest sensor vector cross product to each of the coordinate axes for the external coordinate vectors and the corresponding external coordinate cross product; and
      (iv) determining whether the resulting transformation results in orthogonality within a predetermined degree, and, if so, calculating transformation errors between the known external coordinates and the transformed sensor coordinates; and
   (e) selecting the permutation resulting in the smallest transformation error.

9. A method for calibrating an arbitrarily oriented optical gauging sensor with respect to an external coordinate system, the method comprising;
   providing a target lying simultaneously within a measuring zone of the sensor and a measuring zone of measuring means external to the sensor;
   illuminating the target with a measuring light plane of a sensor optical source to generate at least three non-symetrical illuminated points on the target;

measuring coordinates of the at least three points with the sensor, the measured coordinates expressed in terms of the sensor coordinate system;

measuring coordinates of the at least three points with the external measuring means, the measured coordinates expressed in terms of the external coordinate system;

determining the mean value of each measured coordinate in the sensor coordinate system;

determining the mean value of each measured coordinate in the external coordinate system;

creating a sensor vector for each measured sensor coordinate point, each sensor vector extending from the sensor coordinate mean value point to a corresponding target point coordinate;

creating an external vector for each measured external coordinate point, each external vector extending from the external coordinate mean value point to a corresponding target point coordinate;

ordering pairs of sensor and external coordinates for all possible permutations thereof;

for each permutation, using a least squares approximation to determine a mapping of sensor vectors into external coordinate vectors with acceptable orthogonality; and selecting the permutation resulting in the smallest transformation error.

10. Apparatus for calibrating an arbitrarily oriented non-contact measurement sensor that is pre-calibrated and includes a structured light source and optical sensing means, with respect to an external coordinate system comprising:

external measuring means;

target means lying simultaneously within a measuring zone of the sensor and a measuring zone of the external measuring means and including radiant target points created by the interaction of the target means and the structured light emitted by the sensor; and transformation means coupled for receipt of radiant target point coordinate data relative to the target determined by both the sensor and the external measuring means, the transformation means operative to derive a transformation of sensor coordinate data into external coordinate data using the received target coordinate data from the sensor and the external measuring means.

11. The apparatus of claim 10 further comprising robot means coupled to the sensor for effecting movement of the sensor relative to the target means.

12. The apparatus of claim 10 further comprising robot means coupled to the target means for effecting movement of the target means relative to the sensor.

13. The apparatus of claim 10 wherein the structured light source from the non-contact measurement sensor emits at least one plane of light defining the sensor measuring zone.

14. The apparatus of claim 13 wherein the external measuring means comprises at least two theodolites, each coupled to means for generating measurement data expressed in terms of the external coordinate system.

15. The apparatus of claim 14 wherein the interaction between the structured light emitted by the sensor and target means produces at least three non-symmetrically positioned radiant target points simultaneously viewable by the sensor and the at least two theodolites.

16. The apparatus of claim 14 wherein the interaction between the structured light emitted by the sensor and target means produces four non-symmetrically positioned radiant target points simultaneously viewable by the sensor and the at least two theodolites.

17. The apparatus of claim 16 wherein the target means comprises means releasably coupled to the sensor and carrying four elongate members extending transversely to the at least one plane of light emitted by the structured light source from the sensor, each elongate member having characteristics enabling the generation of a radiant target point at the intersection of the light plane with the elongate member.

18. The apparatus of claim 17 wherein the elongate members extend substantially perpendicularly to the plane of light.

19. The apparatus of claim 17 wherein each elongate member comprises a fiber of white translucent material.

20. The apparatus of claim 10 wherein the transformation means comprises programmable computer means.

21. The apparatus of claim 20 wherein the computer means includes a program for performing the following steps:

(a) creating sensor vectors by subtracting the mean of all sensor coordinates from the coordinates of the target as measured by the sensor;

(b) creating external coordinate vectors by subtracting the mean of all exterior coordinates from the coordinates of the target as measured by the external measuring means;

(c) ordering pairs of sensor and external coordinates in all possible permutations thereof;

(d) for each permutation;

(i) determining a pair of sensor vectors yielding the largest cross product vector therebetween;

(ii) generating a corresponding cross product for a corresponding pair of external coordinate vectors;

(iii) determining a least squares mapping of all sensor vectors and the largest sensor vector cross product to each of the coordinate axes for the external coordinate vectors and the corresponding external coordinate cross product; and (iv) determining whether the resulting transformation results in orthogonality within a predetermined degree, and if so, calculating the transformation errors between the known external coordinates and the transformed sensor coordinates; and (e) selecting the permutation resulting in the smallest transformation error.

22. In a non-contact optical measuring system having a plurality of optical sensors prepositioned with respect to a workpiece to be measured, each optical sensor having means for determining coordinates of points located within the sensor field of view with respect to a sensor coordinate system, an arrangement for calibrating any of the plurality of sensors with respect to an external coordinate system comprising:

external measuring means;

target means releasably coupled to a sensor being calibrated, the target means carrying at least three non-symetrically positioned target point generating elements operative upon illumination by the sensor to generate at least three corresponding illuminated target points simultaneously viewable by the sensor and the external measuring means, such that the sensor can determine coordinates of each target point in terms of the sensor coordinate system and the external measuring means can determine coordinates of each target point in terms of the external coordinate system; and transformation means coupled for receipt of sensor determined coordinate data and external measuring means determined coordinate data for the at least three target points, the transformation means operative to derive a matrix of transform coefficients effective to transform sensor coordinate measurement data into external coordinate measurement data, thereby calibrating a sensor with respect to the external coordinate system.

23. The arrangement of claim 22 wherein the target point generating elements each comprise elongate translucent members and the target means includes first and second side walls for coupling receipt of respective first and second ends of the elongate translucent members such that the elongate members extend generally transversely to a measuring plane of light emitted by the sensor to thereby produce the illuminated target points at intersections of each of the elongate members with the measuring plane of light.

24. The arrangement of claim 23 wherein each elongate translucent member is comprised of a substantially white fiber.

25. The arrangement of claim 23 wherein the elongate translucent members extend substantially perpendicularly to the measuring plane of light.

26. The arrangement of claim 23 further comprising coupling means rigidly but releasably coupled to the sensor and to the target means and including means for adjusting a distance between the sensor and the target means.

27. The arrangement of claim 26 wherein the coupling means includes a first mounting block coupled to the sensor, a second mounting block coupled to one of the first and second side walls and a cylindrical rod-like coupler member positioned for sliding receipt in mating bores in the first and second blocks, the means for adjusting including first and second set screw means respectively received in threaded bores in the first and second mounting blocks, with the threaded bores intersecting respective mating bores.

28. The arrangement of claim 22 wherein the target point generating elements each comprise elongate translucent members and the target means includes a substantially open-faced, cage-like structure for coupling receipt of respective first and second ends of the elongate translucent members such that the elongate members extend generally transversely to a measuring plane of light emitted by the sensor to thereby produce the illuminated target points at intersections of each of the elongate members with the measuring plane of light, the substantially open-faced structure thereby enabling line-of-sight viewing of the target points by the external measuring means from substantially all directions.

29. The arrangement of claim 22 wherein the transformation means comprises a programmable computer means.

30. The arrangement of claim 29 wherein the computer means is programmed to perform the following steps:
(a) determining the mean value of each measured coordinate in the sensor coordinate system;
(b) determining the mean value of each measured coordinate in the external coordinate system;
(c) creating a sensor vector for each measured sensor coordinate point, each sensor vector extending from the sensor coordinate mean value point to a corresponding target point coordinate;
(d) creating an external vector for each measured external coordinate point, each external vector extending from the external coordinate mean value point to a corresponding target point coordinate;
(e) ordering pairs of sensor and external coordinates for all possible permutations thereof;
(f) for each permutation
  (i) determining a pair of sensor vectors yielding the largest cross product vector therebetween;
  (ii) generating a corresponding cross product for a corresponding pair of external coordinate vectors;
  (iii) determining a least squares mapping of all sensor vectors and the largest sensor vector cross product to each of the coordinate axes for the external coordinate vectors and the corresponding external coordinate cross product; and
  (iv) determining whether the resulting transformation results in orthogonality in a predetermined degree and, if so, calculating the transformation errors between the known external coordinates and the transformed sensor coordinates; and
(g) selecting the permutation resulting in the smallest transformation error.

31. A method of calibrating an arbitrarily oriented, pre-calibrated, non-contact measurement sensor with respect to an external coordinate system, the method comprising:

calibrating an independent external measuring system including a pair of theodolites relative to said external coordinate system;

providing a target lying simultaneously within the measuring zone of the sensor and the measuring zone of the theodolites;

using the sensor to determine first spatial coordinates of the target expressed in terms of the sensor's coordinate system;

using the theodolites to determine second spatial coordinates of the target expressed in terms of the external coordinate system; and transforming the first spatial coordinates into coordinates expressed in terms of the external coordinate system using the first and second spatial coordinates of the target.

32. The method of claim 31 wherein said sensor is an optical sensor including a structured light source and optical sensing means and further wherein the structured light source from the optical sensor is used to create the target.

33. Apparatus for calibrating an arbitrarily oriented, pre-calibrated, non-contact measurement sensor having a measuring zone, with respect to an external coordinate system, comprising:

an independent external measuring system including a pair of theodolites calibrated relative to said external coordinate system;

target means lying simultaneously within the measuring zone of the sensor and the measuring zone of said theodolites; and transformation means coupled for receipt of coordinate data relative to the target determined by both the sensor and the external measuring means, the transformation means operative to derive a transformation of sensor coordinate data into external coordinate data using the received target coordinate data from the sensor and the external measuring means.

34. The apparatus of claim 33 wherein the non-contact measurement sensor comprises an optical sensor including a structured light source and optical sensing means and further wherein the interaction of the structured light emitted from the optical sensor and said target means creates a predetermined target pattern.

35. The apparatus of claim 34 wherein said predetermined target pattern comprises a plurality of non-symmetrically positioned radiant target points.

36. The apparatus of claim 35 wherein said target means includes elongated fibers of translucent material.

37. A method of calibrating an arbitrarily oriented, pre-calibrated, non-contact measurement sensor with respect to an external coordinate system, comprising the steps of:

calibrating an independent external measuring system relative to the external coordinate system;

providing a target lying simultaneously within the measurement zone of the sensor and the measurement zone of the independent external measuring system;

using the sensor to determine the spatial coordinates of the target in the sensor's coordinate system;

using the independent external measuring system to determine the translational position and rotational orientation of the target relative to the external coordinate system;

using the data from the previous step to transform the spatial coordinates from the sensor's coordinate system to the external coordinate system.

38. The method of claim 37 wherein the sensor includes a structured light source and optical sensing means and further wherein the target is created with the structured light source from the sensor.

* * * * *

UNITED STATES PATENT AND TRADEMARK OFFICE
CERTIFICATE OF CORRECTION

PATENT NO. : 4,841,460
DATED : June 20, 1989
INVENTOR(S) : Robert Dewar et al.

It is certified that error appears in the above-identified patent and that said Letters Patent is hereby corrected as shown below:

Abstract, line 2, "non-contacting" should be --non-contact--.

Column 1, line 53, "of" (first occurrence) should be --or--.

Column 2, line 40, "of" (first occurrence) should be --or--.

Column 5, line 19, "plus" should be --plug--.

Column 5, line 50, "cage-like" should be --cage-type--.

Column 9, line 59, claim 1, "structural" should be --structured--.

Column 13, line 39, claim 27, after "second", insert --mounting--.

Signed and Sealed this

Twenty-fourth Day of April, 1990

Attest:

HARRY F. MANBECK, JR.

*Attesting Officer*   *Commissioner of Patents and Trademarks*